US012706231B2

(12) United States Patent
Chong

(10) Patent No.: US 12,706,231 B2
(45) Date of Patent: Aug. 11, 2026

(54) ELECTRIC POWER SAVING DEVICE AND METHOD FOR MANUFACTURING SAME

(71) Applicant: THE THINKING LION CO., LTD., Gunposi (KR)

(72) Inventor: Jungyong Chong, Seoul (KR)

(73) Assignee: THE THINKING LION CO., LTD., Gyeonggi-do (KR)

( * ) Notice: Subject to any disclaimer, the term of this patent is extended or adjusted under 35 U.S.C. 154(b) by 188 days.

(21) Appl. No.: 18/577,654

(22) PCT Filed: Jul. 8, 2022

(86) PCT No.: PCT/KR2022/009990
§ 371 (c)(1),
(2) Date: Jan. 8, 2024

(87) PCT Pub. No.: WO2023/282708
PCT Pub. Date: Jan. 12, 2023

(65) Prior Publication Data
US 2024/0379261 A1 Nov. 14, 2024

(30) Foreign Application Priority Data
Jul. 9, 2021 (KR) ........................ 10-2021-0090417

(51) Int. Cl.
*H01B 7/42* (2006.01)

(52) U.S. Cl.
CPC .................................... *H01B 7/421* (2013.01)

(58) Field of Classification Search
CPC ... H01B 1/02; H01B 1/04; H01B 1/08; H01B 7/42; H01B 7/421; H01R 11/20; H01R 13/03; H01R 13/10; H01R 13/66; H01R 13/70; H01R 13/73; C22C 30/00; B60L 11/1875
USPC ...... 174/74 R–88 C; 333/125, 245; 439/394, 439/578; 324/72.5
See application file for complete search history.

(56) References Cited

U.S. PATENT DOCUMENTS

| | | | | |
|---|---|---|---|---|
| 3,602,872 A * | 8/1971 | Braunstein | H01R 4/2406 | 337/201 |
| 6,362,709 B1 * | 3/2002 | Paxman | H01P 5/02 | 333/125 |
| 2015/0142237 A1 * | 5/2015 | Wu | B60L 1/003 | 701/22 |

FOREIGN PATENT DOCUMENTS

| | | | | |
|---|---|---|---|---|
| JP | 2017208996 A | 11/2017 | | |
| KR | 101147195 B1 | 5/2012 | | |
| KR | 101596645 B1 | 2/2016 | | |
| KR | 20200053667 A * | 5/2020 | C22C 30/00 | |
| KR | 20210128556 A | 10/2021 | | |
| KR | 20210156375 A | 12/2021 | | |
| KR | 102853182 B1 * | 9/2025 | H02J 9/005 | |

(Continued)

OTHER PUBLICATIONS

International Search Report, PCT/KR2022/009990, Oct. 31, 2022, 4 pages.

*Primary Examiner* — William H. Mayo, III

(57) ABSTRACT

An electric power saving device may include an electrode part which is electrically connected to an electric line and made of a material having electrical conductivity and thermal conductivity wherein a material part maintains a state of being in close contact with the surface 5 of the electrode part and including N (N>2) materials for removing thermal energy inside the electric line conducted to the electrode part.

13 Claims, 4 Drawing Sheets

(56) References Cited

FOREIGN PATENT DOCUMENTS

| | | | |
|---|---|---|---|
| WO | 2012023677 | A1 | 2/2012 |

* cited by examiner (a)

(b)

| CATEGORY | 2TH(%) | 3TH(%) | 4TH(%) | 5TH(%) | 6TH(%) | 7TH(%) | 8TH(%) | 9TH(%) | 10TH(%) | 11TH(%) |
|---|---|---|---|---|---|---|---|---|---|---|
| BEFORE INSTALLING | 3.37 | 3.21 | 2.47 | 9.43 | 3.00 | 3.73 | 3.39 | 2.83 | 2.80 | 3.29 |
| AFTER INSTALLING | 1.12 | 1.15 | 0.72 | 6.45 | 0.71 | 1.39 | 0.95 | 0.61 | 0.63 | 1.10 |
| REDUCTION RATE | -66.66% | -64.14% | -71.07% | -31.66% | -76.43% | -62.74% | -71.93% | -78.55% | -77.69% | -66.56% |

| CATEGORY | 12TH(%) | 13TH(%) | 14TH(%) | 15TH(%) | 16TH(%) | 17TH(%) | 18TH(%) | 19TH(%) | 20TH(%) | THDi(%) |
|---|---|---|---|---|---|---|---|---|---|---|
| BEFORE INSTALLING | 2.72 | 3.01 | 2.69 | 2.80 | 3.13 | 2.70 | 3.03 | 2.68 | 3.70 | 20.07 |
| AFTER INSTALLING | 0.79 | 1.11 | 0.75 | 0.68 | 0.71 | 0.71 | 0.68 | 0.79 | 0.97 | 10.38 |
| REDUCTION RATE | -71.13% | -63.05% | -71.97% | -75.86% | -77.21% | -73.55% | -77.46% | -70.55% | -73.73% | -48.27% |

ELECTRIC POWER SAVING DEVICE AND METHOD FOR MANUFACTURING SAME

TECHNICAL FIELD

The present disclosure relates to a passive type electric power saving device for reducing resistance of an electrical line to reduce current loss by using an electrode part having electrical conductivity and thermal conductivity and a material part having electrical insulation to conduct thermal energy (or heat) inside the electrical line electrically connected to the electrode part to the material part to thus remove the thermal energy.

BACKGROUND ART

One of the difficult problems that have not been solved from the late 1800s in which Edison developed a practical light bulb and Tesla developed an Alternating Current (AC) motor to the present is the development of technology to remove thermal energy existing inside electric lines. Although many engineers have made a lot of effort to solve this problem over a long period of time, they have failed to develop commercialized technology.

The thermal energy is generated by heat generated by the thermal action of current, heat generated by harmonics, heat generated by the phase difference of inductive load, heat generated by 3-phase inequilibrium, heat generated by starting current, and heat generated in various mechanical devices, and kinetic energy generated by the heat is called thermal energy. Heat is a medium for transferring energy, but thermal energy is a type of kinetic energy. Accordingly, thermal energy has a physical magnitude (intensity and density) according to the total amount. When the thermal energy is coupled with multiple harmonics in electric lines, the thermal energy increases the energy density of the harmonics and increases resistance components inside the electric lines, which becomes a cause of current loss. Accordingly, removing the thermal energy reduces loss of current flowing through the electric lines to save electricity.

Conventional electric power saving technologies include a voltage drop method and a power factor improvement method.

The voltage drop method is a technology of artificially lowering a voltage V within a natural variation range to reduce power (W) consumption. However, the method has a problem of noise generation because of using electronic circuits. Upon application to a motor, the method reduces the rpm of the motor, and upon application to a lighting, the method reduces the illumination of the lighting. Also, the method has a problem of causing electrical hazards and damage such as power failure or fire when the power saver fails. Accordingly, industrial factories have never used the voltage drop method and recently, the method is being forced out of home, buildings, and shopping stores because of the above-described problems.

The power factor improvement method as another electric power saving technology is a method of saving power by compensating the phase difference of inductive load. The inductive load has a phase difference of 90 degrees between voltage and current, and the phase difference causes current loss. The power factor improvement method is a power saving technology that increases the efficiency of active power by reducing reactive power by advancing the phase of current through a condenser for power factor improvement. The power factor improvement method has an advantage of being easy to install and low cost, but has a problem that, when the function of the condenser deteriorates over time or the condenser is damaged by surge, earth fault, etc., power consumption increases by 15% to 20% or more as the lagging power factor and leading power factor change at intervals of 30 minutes to 1 hour. The power factor improvement method also has a problem of increasing power consumption because the power factor value changes depending on the number of machine operations. In order to solve this problem, some industrial factories have installed capacitor banks to appropriately allocate capacity, or installed timers to turn off the power during non-operational times (for example, at night, etc.).

Meanwhile, the conventional power saving technologies could reduce current loss generated by the phase difference of inductive load, however, a power saving technology that can prevent current loss generated by the following 6 causes has not yet been developed.

1) Inductive load generates current loss by the phase difference of voltage which is ahead of current by 90 degrees. However, because the phase difference cannot be compensated to 100% although current loss is partially compensated by the conventional electric power saving technologies such as the power factor improvement method, etc., heat is generated to increase the resistance component in electric lines, resulting in generation of current loss. The conventional electric power saving technologies could not resolve the problem.
2) A thermal action of current is caused by collisions between free electrons and atoms when the current flows, and increases in proportion to the increase in voltage, current, and time. The thermal action of current has a problem of increasing the resistance component inside the electric lines to cause current loss, and the conventional electric power saving technologies could not resolve the problem.
3) Harmonics are distortion waves that occur when the frequency of 60 Hz (or 50 Hz) used in alternating current pass through non-linear equipment, and the $2^{nd}$ (120 Hz) to $50^{th}$ (3,000 Hz) waveforms are defined as harmonics. These harmonics have a problem of deteriorating power quality and greatly increasing the resistance component inside conducting wires to cause current loss, and the conventional electric power saving technologies could not resolve the problem.
4) Starting current refers to a huge amount of current (for example, 6 to 10 times more current than in the operating state) that flows during the initial operation of the motor because the resistance value of the motor is very small in the stopped state. When a huge amount of current corresponding to the starting current flows through the coil of an inductive load, a problem that the frequency increases, the flow of current is interrupted, heat is generated, and the resistance value of the coil gradually increases, thus reducing the amount of current, is generated. The conventional electric power saving technologies could not resolve the problem.
5) In the 3-Phase Inequilibrium, most of R phase, S phase, and T phase are in an inequilibrium state. In the case of the 3-Phase Inequilibrium, there is a problem that heat is generated in the area where more current flows than in the other phases, and a voltage drop occurs significantly, causing current loss. The conventional electric power saving technologies could not resolve the problem.
6) When heat is generated internally during the operation of various mechanical devices (for example, machinery, equipment, air conditioners, etc. in a factory) that use electricity, the heat flows into electric lines to raise temperature inside the lines and increase the line resistance component, thus causing current loss. The conventional electric power saving technologies could not resolve the problem.

Accordingly, it is necessary to develop an electric power saving technology and device based on new technological principles that can block current loss caused by the above six factors.

DISCLOSURE

Technical Problem

It is an object of the disclosure to provide an electric power saving device including an electrode part electrically connected to an electric line and made of a material having electric conductivity and thermal conductivity, and a material part maintained in close contact with a surface of the electrode part and including N (N≥2) materials for implementing electrical insulation characteristics and thermal energy removal characteristics of removing thermal energy inside the electric line, conducted to the electrode part.

Technical Solution

An electric power saving device according to the disclosure may include an electrode part electrically connected to an electric line and made of a material having electrical conductivity and thermal conductivity, and a material part maintained in close contact with a surface of the electrode part and including N (N≥2) materials for implementing electrical insulation characteristics and thermal energy removal characteristics of removing thermal energy inside the electric line, conducted to the electrode part.

In the electric power saving device according to the disclosure, the material part may remove thermal energy generated in the electric line and primarily conducted to the electrode part.

In the electric power saving device according to the disclosure, the material part may remove thermal energy generated in a designated source electrically connected to the electric line, primarily conducted to the electric line, and then secondarily conducted to the electrode part.

In the electric power saving device according to the disclosure, while power of the electric line is applied to the electrode part, the material part may maintain a thermal equilibrium state corresponding to surface temperature within a preset allowable temperature range with respect to temperature of the electrode part.

In the electric power saving device according to the disclosure, while power of the electric line is applied to the electrode part, the material part may maintain a thermal equilibrium state corresponding to surface temperature of atmosphere temperature or less.

In the electric power saving device according to the disclosure, while power of the electric line is applied to the electrode part, the material part may maintain a thermal equilibrium state corresponding to surface temperature within a preset temperature range in a range of 18° C. to 35° C.

In the electric power saving device according to the disclosure, while the material part is outside the thermal equilibrium state, a plurality of electrode parts being in close contact with a plurality of material parts may be multiply-connected to the electric line by a preset electrical connection method to increase a volume or surface area of the material part and thereby maintain the thermal equilibrium state.

In the electric power saving device according to the disclosure, the thermal energy removal characteristics may include characteristics of removing a harmonic of the electric line connected to the electrode part.

In the electric power saving device according to the disclosure, the thermal energy removal characteristics may include characteristics of reducing intensities of $2^{nd}$ to $50^{th}$ harmonics existing in the electric line connected to the electrode part.

In the electric power saving device according to the disclosure, the N metal materials may include n (1≤n≤N) metal materials through which no current flows and which have magnetism to prevent short circuit between terminals.

In the electric power saving device according to the disclosure, the N metal materials may be maintained in a state of being pulverized into a preset particle size range and distributed uniformly in the material part.

In the electric power saving device according to the disclosure, the material part may be maintained in a state resulting from mixing N materials pulverized into a preset particle size range with a preset binder while matching with a preset weight % ratio range and then drying and hardening the mixture.

In the electric power saving device according to the disclosure, the binder may prevent the N materials from contacting oxygen of an atmosphere.

In the electric power saving device according to the disclosure, the material part may be maintained in a state of being hardened with a compressive strength range of at least 85 $kgf/cm^2$ or more.

In the electric power saving device according to the disclosure, the material part may include characteristics of causing no crack at a low voltage while a voltage of 1,000 V or more is applied to the electrode part for one minute or more, or characteristics of causing no crack at a high voltage while a voltage of 12,000 V or more is applied to the electrode part for one minute or more.

In the electric power saving device according to the disclosure, the N materials included in the material part 110 may include oxides having electrical insulation characteristics and thermal energy removal characteristics.

In the electric power saving device according to the disclosure, the oxides may be prevented from contacting oxygen in an atmosphere through a preset binder in the state of being pulverized into the preset particle size range and bonded or hardened through the preset binder to thereby be prevented from an additional oxidation reaction.

In the electric power saving device according to the disclosure, the oxides may include aluminum oxide ($Al_2O_3$), and further include at least one metal oxide of iron oxide ($Fe_2O_3$), magnesium oxide (MgO), or silicon dioxide ($SiO_2$).

In the electric power saving device according to the disclosure, the N materials may contain at least 30 weight % or more of aluminum oxide ($Al_2O_3$).

In the electric power saving device according to the disclosure, the electrode part may include a surface area per unit length that is larger than or equal to a surface area per unit length of the electric line.

The electric power saving device according to the disclosure may include a case that accommodates the material part including the electrode part and is maintained in contact with at least one area of surface areas of the material part.

A method of manufacturing an electric power saving device according to the disclosure may include a first operation of preparing N (N≥2) materials for implementing electrical insulation characteristics and thermal energy removal characteristics, a second operation of pulverizing the prepared N materials into the preset particle size range, a third operation of mixing the pulverized N materials with a binder to produce a liquid mixture liquefied, a fourth operation of pouring the liquid mixture into a case including M (M≥1) electrode parts including an electrically conductive and thermally conductive material to cause the liquid mixture to be in close contact with the electrode parts, and a fifth operation of drying the liquid mixture while causing the liquid mixture to be maintained in close contact with the electrode parts.

In the method of manufacturing the electric power saving device according to the disclosure, the first operation may include an operation of preparing i (i≥1) raw materials including the N materials each matching with a preset weight % ratio range.

In the method of manufacturing the electric power saving device according to the disclosure, the first operation may include an operation of preparing j (j≥1) raw materials including s (1≤s≤N) materials among the N materials and preparing t (1≤t≤N) materials for matching weight % for each of the s materials with a preset weight % ratio range.

Advantageous Effects

According to the disclosure, by connecting an electric power saving device according to the disclosure to an electric line to remove thermal energy inside the electric line, current loss caused by the thermal energy inside the electric line may be minimized, resulting in power saving.

According to the disclosure, by blocking or minimizing current loss caused by heat generated by harmonics, starting current, 3-phase inequilibrium, and a non-uniform phase difference of inductive load, a thermal action of current, and heat generated in various electric devices, among power saving targets that have been impossible to save power with conventional power saving technologies, power may be saved.

According to the disclosure, when the electric power saving device according to the disclosure is connected in parallel to mechanical equipment, power may be saved by 7% to 10%, and when the electric power saving device is connected in series to the mechanical equipment, power may be saved by 9% to 16%. In the case of factories with low power quality or aging electric lines, power may be saved by 16% to 20%, and in the case of industrial factories where a generation quantity of harmonics is 30% or more, power may be stably saved by 20% to 30%.

Meanwhile, because conventional electric power saving devices are manufactured using electrical components, upon failure or function deterioration of the components, power consumption has increased and a cause of fire has been provided. However, because the electric power saving device according to the disclosure does not use any electric components, the electric power saving device may not cause a problem that revolutions per minute (RPM) of a motor is reduced or illumination of a lighting is lowered, and above all, the electric power saving device may not have any effect on existing mechanical equipment. The electric power saving device according to the disclosure will not cause any fire. In addition, the electric power saving device may have an advantage of being able to be used semi-permanently for 30 years or more unless artificial damage is applied thereto.

According to the disclosure, by connecting the electric power saving device according to the disclosure to an electric line to remove thermal energy inside the electric line, an additional advantage of reducing intensities of all harmonics ($2^{nd}$ to $50^{th}$) in the electric line by 65% or more may be obtained.

According to the disclosure, the electric power saving device according to the disclosure may lower an intensity of harmonics up to a level of 65% by removing thermal energy inside an electric line, thereby blocking 90% or more of many damages that are generated by harmonics. Harmonics cause damages, such as current loss, causing excessive current to flow through a neutral line to cause a fire, stopping a production line, damaging PCBs and components of a control panel, and accelerating deterioration of electronic components. However, because the electric power saving device according to the disclosure does not use any electrical components, the electric power saving device may be not influenced by impedance to be used at all frequencies and have an additional advantage of removing high frequency noise.

According to the disclosure, installing the electric power saving device according to the disclosure in lighting equipment (Light Emitting Diode (LED), fluorescent lighting) provides advantages of guaranteeing a lifespan more than doubled and maintaining illumination for a long period of time due to a harmonic reduction effect.

According to the disclosure, installing the electric power saving device according to the disclosure in Concent and Multi Tap provides advantages of saving electricity that is supplied to each device (for example, a Personal Computer (PC), an air conditioner, a refrigerator, etc.) through the Concent and Multi Tap and reducing harmonics.

According to the disclosure, because the electric power saving device according to the disclosure can be manufactured with various shapes and sizes depending on power usage capacity, the electric power saving device may be used without changing an instrument of equipment or circuitry.

According to the disclosure, the electric power saving device according to the disclosure can solve problems of power saving and harmonics, which have not been solved for 130 years after Edison developed a practical light bulb and Tesla developed an Alternating Current (AC) motor.

BEST MODE

The electric power saving device according to the disclosure may include an electrode part electrically connected to an electric line and made of a material having electrical conductivity and thermal conductivity, and a material part maintained in close contact with a surface of the electrode part and including N (N≥2) materials for implementing electrical insulation characteristics and thermal energy removal characteristics of removing thermal energy inside the electric line, conducted to the electrode part.

Modes of the Disclosure

Hereinafter, the operation principle of the preferred embodiments of the present disclosure will be described in detail with reference to the accompanying drawings and description. It should be understood, however, that the drawings and the following description relate to preferred embodiment methods among various methods for efficiently describing features of the present disclosure, and the present disclosure is not limited to the drawings and the following description.

That is, it should be clearly stated that the following embodiments correspond to embodiments in a preferred union form among many embodiments of the present disclosure, and, in the following embodiments, an embodiment of omitting a specific component, an embodiment of dividing a function implemented in a specific component into specific components, an embodiment of integrating a function implemented in two or more components into any one component, an embodiment of changing an operation order of a specific component, etc. belong to the scope of right of the disclosure although not mentioned in the following embodiments. Therefore, it should be clearly stated that various embodiments corresponding to subsets or complementary sets based on the following embodiments can be subdivided based on the filing date of the present disclosure.

In the following description of the present disclosure, a detailed description of known functions or configurations incorporated herein will be omitted when it may make the subject matter of the present disclosure rather unclear. In addition, the terms described below are defined in consideration of the functions of the present disclosure, which may vary depending on the intention or custom of a user or operator. Therefore, definitions of these terms should be made based on the contents throughout the disclosure.

As a result, the technical idea of the present disclosure is determined by the claims, and the following embodiments are merely means for effectively explaining the advanced technical idea of the present disclosure to persons having ordinary skill in the art to which the present disclosure belongs.

Figure 1:
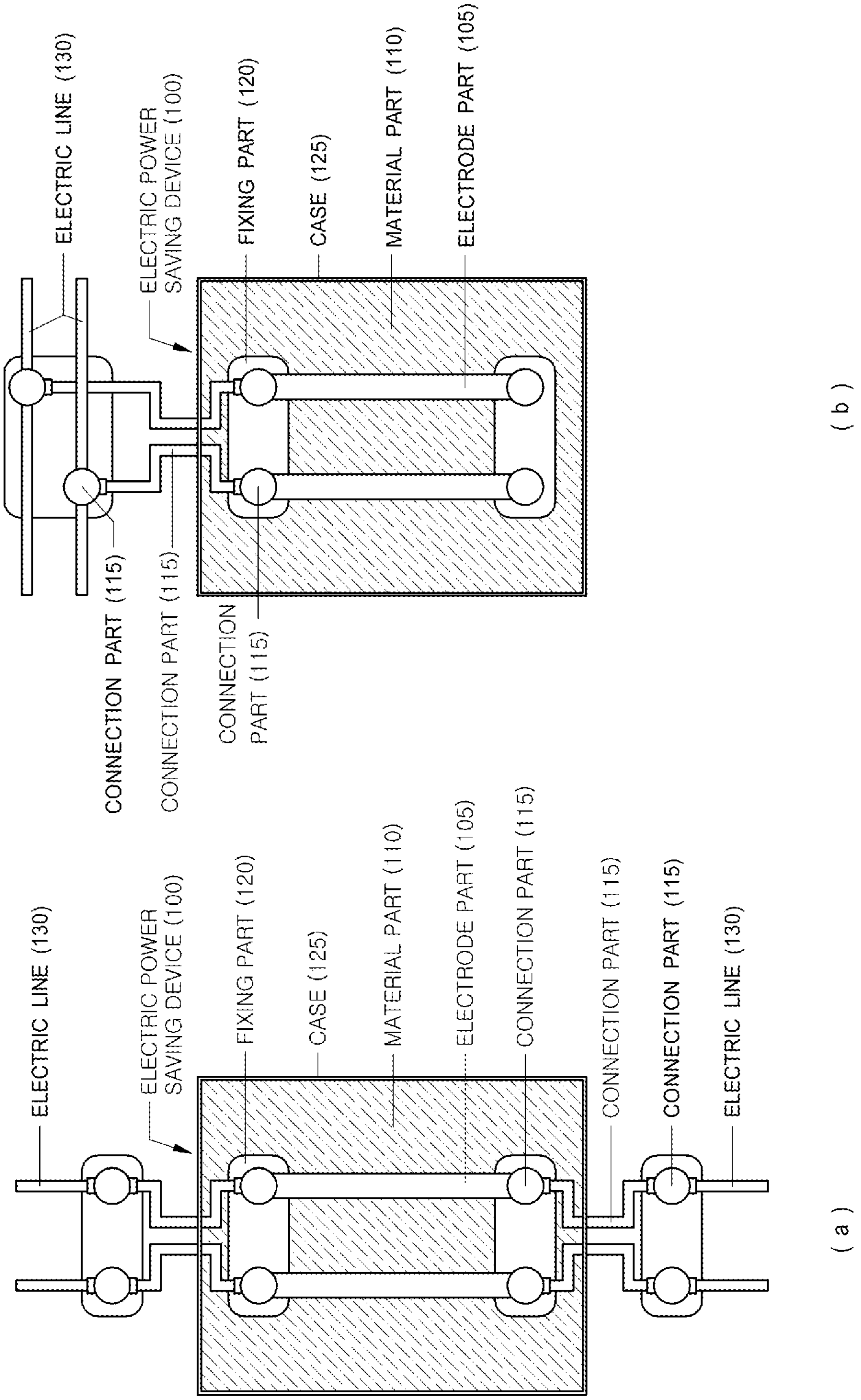
FIG. 1 shows a configuration of a passive type electric power saving device 100 according to an embodiment method of the disclosure.

FIG. 1 shows a configuration of a passive type electric power saving device 100 according to an embodiment method of the disclosure.

More specifically, FIG. 1 shows an embodiment of the electric power saving device 100 for saving power by removing thermal energy of the electric line 130 using a material part 110 that is maintained in close contact with a surface of an electrode part 105 electrically connected to the electric line 130 and made of a material having electrical conductivity and thermal conductivity and has characteristics of being electrically insulated from the electrode part 105 and thermal energy removal characteristics of removing thermal energy of the electrode part 105. One of ordinary skill in the art to which the present disclosure belongs will be able to infer various embodiment methods (for example, embodiments of omitting, subdividing or combining some components) for a configuration of the electric power saving device 100 by referring to and/or changing FIG. 1, the present disclosure may include all the inferred embodiment methods, and the technical feature of the present disclosure is not limited only to the embodiment method shown in FIG. 1.

(a) of FIG. 1 shows a configuration of a serial electric power saving device 100 connected in series to the electric line 130, and (b) of FIG. 1 shows a configuration of a parallel electric power saving device 100 connected in parallel to the electric line 130. For example, the serial electric power saving device 100 may be installed in power supplies of various electric devices using electricity to save power consumption of the electric devices, or the serial electric power saving device 100 may be installed in a socket or power strip to save consumption of power that is supplied through the socket or power strip. The parallel electric power saving device 100 may be installed in a secondary side of a No Fuse Breaker (NFB) switch of a switch board (Air Circuit Breaker (ACB), Molded Case Circuit Breaker (MCCB)) or a distribution panel in an industrial factory to save consumption of power entered through the switch board or distribution panel. Meanwhile, according to an experiment by the applicant, the parallel electric power saving device 100 installed in a switch board or distribution panel has saved power of an electric heating furnace by about 7% to 8%, power of an inductive electric furnace by about 7% to 8%, power of a compressor by about 6% to 7%, power of an air conditioner by about 8% to 10%, power of a general air conditioner by about 4.0% to 4.8%, power of a freezer by about 7% to 8%, power of a circulation pump by about 2.5% to 3.5%, and power of a bakery oven by about 20%, and the parallel electric power saving device 100 has saved total power of an industrial factory by about 7% to 10% on average, power of an supermarket and department store by about 7% to 8%, power of an ice cream store by about 8% to 9%, power of home by about 6% to 8% during normal months, and power of home by about 19% to 16% in summer in which an air conditioner is used.

In order to transmit electricity without any loss, an input impedance value Zin of an electric line needs to be identical to an output impedance value Zout of the electric line. Except for a superconductor with line resistance of zero, a medium of which an input impedance is identical to an output impedance does not exist. The reason is because of resistance and reactance components which cause current loss which leads to power loss. The present disclosure may block an increase of a resistance component generated by an external factor not an internal factor such as specific resistance of a conductor to reduce current loss, thereby saving power.

The electric power saving device 100 according to the disclosure may include an electrode part 105 electrically connected to the electric line 130 and made of a material having electrical conductivity and thermal conductivity, and a material part 110 maintained in close contact with a surface of the electrode part 105 and including N (N≥2) materials for implementing electrical insulation characteristics and characteristics of removing thermal energy of the electric line 130, conducted to the electrode part 105. Meanwhile, the electric power saving device 100 may further include a case 125 that accommodates the material part 110 including the electrode part 105 and is maintained in contact with at least one area of surface areas of the material part 110.

The electric line 130 is a general term of a line that receives and supplies designated power, and may include a material having electrical conductivity and thermal conductivity. According to an embodiment method of the disclosure, the electric line 130 may receive alternating current power from a switch board or distribution panel, and supply the alternating current power. Meanwhile, the alternating current power may include a voltage, current, and frequency designated by country and/or application (for example, for home or industrial use).

The electrode part 105 is a general term of a component electrically connected to the electric line 130 and having both electrical conductivity characteristics of conducting electricity applied to the electric line 130 and thermal conductivity characteristics of conducting thermal energy generated in the electric line 130 or a designated source (for example, various mechanical devices using electricity) connected to the electric line 130. The electrode part 105 may be included at a preset location inside the material part 110, and maintained in close contact with the material part 110.

According to an embodiment method of the disclosure, the electrode part 105 may include at least one of metal materials having both electrical conductivity characteristics and thermal conductivity characteristics. Preferably, the electrode part 105 may include the same material as the electric line 130, or a material having electrical conductivity and thermal conductivity that are equal to or higher than those of the electric line 130 within a preset range.

According to an embodiment method of the disclosure, it may be preferable that the electrode part 105 has a surface area per unit length that is larger than or equal to a surface area per unit length of the electric line 130. Accordingly, the electrode part 105 may more efficiently conduct thermal energy transferred from the electric line 130 to the material part 110 being in close contact with the electrode part 105 to remove the thermal energy.

The material part 110 may include the electrode part 105 at a preset location spaced apart by a preset distance or more from a surface area, and the material part 110 may be maintained in close contact with a surface area of the electrode part 105. The material part 110 may include N materials for implementing electrical insulation characteristics and thermal energy removal characteristics of removing thermal energy inside the electric line 130, conducted to the electrode part 105.

According to an embodiment method of the disclosure, the material part 110 may remove thermal energy generated in the electric line 130 and primarily conducted to the electrode part 105. Also, the material part 110 may remove thermal energy generated in a designated source (for example, various electric devices using electricity) connected to the electric line 130, primarily conducted to the electric line 130, and then secondarily conducted to the electrode part 105. Meanwhile, the thermal energy conducted to the electrode part 105 may include at least one thermal energy among thermal energy generated by harmonic noise, thermal energy generated by starting current, thermal energy generated by 3-phase inequilibrium, thermal energy generated in various electric devices using electricity, thermal energy generated by inductive load, and thermal energy generated by a thermal action of current. That is, the thermal energy conducted to the electrode part 105 may generally include a combination of two or more causes although it has been generated by any cause.

Meanwhile, according to an embodiment method of the disclosure, in regard of the remaining thermal energy (for example, thermal energy generated by starting current, thermal energy generated by 3-phase inequilibrium, thermal energy generated in various electric devices using electricity, thermal energy generated by inductive load, etc.) excluding thermal energy generated by harmonic noise and thermal energy generated by a thermal action of current among thermal energy conducted to the electrode part 105, a source generating the corresponding thermal energy includes a component (for example, an electrode part, a conductive material, a metal case, etc.) for removing the generated thermal energy, and accordingly, a percentage of the remaining thermal energy conducted to the electrode part 105 may be smaller than a preset percentage except for special environments (for example, an environment using an electric furnace, etc.). Meanwhile, in regard of thermal energy generated by resistance of the electric line 130, a percentage of the thermal energy generated by the resistance of the electric line 130 may be maintained at a smaller percentage than a preset percentage, unless excessive power is temporarily used or the resistance of the electric line 130 temporarily increases. However, when a harmonic source (for example, an AC/DC supply or a device generating electromagnetic waves or frequency signals) generating harmonics exists in a region including the electric power saving device 100 according to the disclosure, thermal energy conducted to the electrode part 105 may include thermal energy generated by harmonic noise.

Meanwhile, according to studies by the applicant, the following correlation between harmonic noise and thermal energy was found. It was confirmed that, when heat inside the electric line 130 is not removed, a total harmonic level increases due to a combination of multiple harmonics and a recombination of heat inside the electric line 130, and thus, energy density per unit area increases rapidly to activate (or increase) thermal energy which is kinetic energy. That is, when harmonics are maintained (or enter) without removing thermal energy inside the electric line 130 while thermal energy (for example, one or more thermal energy among thermal energy generated by harmonic noise, thermal energy generated by a thermal action of current, thermal energy generated by starting current, thermal energy generated by 3-phase inequilibrium, and thermal energy generated in various electric devices using electricity, or thermal energy generated by a phase difference of inductive load) caused by a specified cause exists inside the electric line 130, the thermal energy inside the electric line 130 is activated (or increased) due to a combination of multiple harmonics and a recombination of heat inside the electric line 130, and continuously flows through the line like a tsunami or large wave, causing damage. On the other hand, it was confirmed that, when thermal energy inside the electric line 130 is removed or thermal equilibrium is maintained in a preset temperature range, the intensities of all harmonics (for example, $2^{nd}$ to $50^{th}$ harmonics) inside the electric line 130 are reduced at once. The percentage is 65% or more on average. In addition, a power saving rate also increases to average reduction rate x (0.35 to 0.40). When a removal rate of harmonics is 65%, a power saving rate increases sharply to 22.7%. Meanwhile, when thermal energy inside the electric line 130 is removed, a resistance component on the electric line 130 may be reduced to save power, and the reduction in the resistance component may reduce generation of thermal energy in the electric line 130 again. The thermal energy removal characteristics of the material part 110 may reduce the resistance component on the electric line 130 to thereby provide a power saving function, and may also provide characteristics of removing harmonics of the electric line 130. Particularly, the thermal energy removal characteristics of the material part 110 may provide characteristics of simultaneously reducing intensities of $2^{nd}$ to $50^{th}$ harmonics existing in the electric line 130 by a preset ratio or more.

The material part 110 may absorb thermal energy conducted to the electrode part 105 through conduction to remove 80% or more of the thermal energy, and/or may absorb thermal energy conducted to the electrode part 105 through conduction and then remove 20% or more of the thermal energy by emitting the thermal energy, thereby removing the thermal energy of the electric line 130 connected to the electrode unit 105. This may be possible because the internal temperature of the electric line is as low as 18° C. to 35° C. Meanwhile, the material part 110 may maintain a thermal equilibrium state within a preset temperature range while removing thermal energy conducted to the electrode part 105.

While an electric device operates, internal temperature of the electric line 130 may be higher than internal temperature of the material part 110, and the material part 110 may absorb thermal energy conducted to the electrode part 105 through the electric line 130 to thereby remove the thermal energy. The thermal energy absorbed through the material part 110 may be conducted uniformly to all areas within the material part 110 by thermal conductivity of the material part 110, and may be used to maintain a thermal equilibrium state which maintains surface temperature of each area of the material part 110 in an equal temperature range within a tolerance range. This process may be accomplished when the internal temperature of the electric line 130 is in a temperature range of about 18° C. to 35° C. Meanwhile, when atmosphere temperature around the material part 110 is lower than surface temperature of the material part 110, at least a part of thermal energy absorbed in the material part 110 may be emitted to the atmosphere through each exposed surface area of the material part 110 or a thermally conductive material of the case 125 being in contact with the surface of the material part 110 and be removed. In this case, surface temperature of each area of the material part 110 may also be maintained in a thermal equilibrium state.

Meanwhile, surface temperature of the material part 110 and temperature of thermal energy conducted to the electrode part 105 may be maintained in a thermal equilibrium state of a matched temperature range within a preset allowable temperature range. For example, when temperature of the electrode part 105 is 23° C., surface temperature of the material part 110 may be maintained in a thermal equilibrium state within a preset temperature range based on the temperature of 23° C. In this case, the material part 110 may absorb thermal energy conducted to the electrode part 105 through conduction and conduct the thermal energy uniformly to each internal area, thereby using the thermal energy to maintain a thermal equilibrium state of the material part 110 or removing the thermal energy by emitting the thermal energy to the atmosphere through each exposed surface area of the material part 110 or the thermally conductive material of the case 125.

According to a first embodiment related to surface temperature of the material part 110 that removes thermal energy of the electrode part 105 while power of the electric line 130 is applied to the electrode part 105, the material part 110 may maintain a thermal equilibrium state corresponding to surface temperature below atmosphere temperature around the material part 110 while the power of the electric line 130 is applied to the electrode part 105. For example, when atmosphere temperature around the material part 110 is 23° C., surface temperature of the material part 110 may be maintained at 23° C. or less.

According to a second embodiment related to surface temperature of the material part 110, the material part 110 may maintain a thermal equilibrium state corresponding to surface temperature within a preset temperature range in a range of 18° C. to 35° C. while the power of the electric line 130 is applied to the electrode part 105.

When surface temperature of the material part 110 is outside the temperature range of 18° C. to 35° C., the present disclosure may manage atmosphere temperature around the material part 110 to maintain the temperature range of 18° C. to 35° C., thereby matching the surface temperature of the material part 110 with the temperature range of 18° C. to 35° C.

Meanwhile, when surface temperature of the material part 110 is outside the thermal equilibrium state corresponding to the temperature range of 18° C. to 35° C. even though atmosphere temperature around the material part 110 is maintained in the temperature range of 18° C. to 35° C., the present disclosure may multiply-connect a plurality of electrode parts 105 being in close contact with a plurality of material parts 110 to the electric line 130 by a preset electrical connection method (for example, a serial connection method, a parallel connection method, or a combined connection method of series connection and parallel connection) to increase a volume or surface area of the material part 110, thereby maintaining the surface temperature of the material part 110 in the thermal equilibrium state corresponding to the temperature range of 18° C. to 35° C. Meanwhile, although the surface temperature of the material part 110 maintains the thermal equilibrium state corresponding to the temperature range of 18° C. to 35° C., the present disclosure may increase a volume or surface area of the material part 110 by multiply-connecting the plurality of electrode parts 105 being in close contact with the plurality of material parts 110 to the electric line 130 by the preset electrical connection method, to stably maintain the thermal energy removal characteristics of the material part 110.

Meanwhile, the N materials included in the material part 110 may be pulverized into a preset particle size range (for example, a particle size of 100 mesh or more) and distributed uniformly in the material part 110.

The present disclosure may pulverize the N materials into the preset particle size range to produce a powder mixture, mix and stir the N materials pulverized into the preset particle size range with a preset binder while matching with a preset weight % ratio range to produce a liquid mixture, pour the liquid mixture into the case 125 in which M (M≥1) electrode parts 105 are arranged and fixed at preset positions in the internal space, and dry or harden the liquid mixture in a state in which the electrode parts 105 are in close contact with the liquid mixture, thereby producing the material part 110. The binder may bind the N materials pulverized into the preset particle size range or maintain a hardened state of the N materials, while forming a film that prevents the N materials from contacting oxygen in the atmosphere such that the N materials are no longer oxidized. For example, the binder may include an epoxy-based binder. Upon application of eco-friendly regulations, instead of the epoxy, the binder may include a binder (for example, a binder containing 2-Hydroxyethyl methacrylate and toluene d-iso cyanate, a binder containing caster oil and toluene diisocyanate, a binder containing vinyl acetate, etc.) of an eco-friendly material.

According to an embodiment method of the present disclosure, it may be preferable that the material part 110 is maintained in a hardened state within a compressive strength range of at least 85 $kgf/cm^2$ or more. When there is a possibility that a compressive strength of the material part 110 will fail to reach a preset compressive strength range through bonding and hardening by the binder or when it is intended to harden to the preset compressive strength range, a curing agent for hardening a compressive strength of the material part 110 to the preset compressive strength range may be added and mixed while matching with a preset weight % ratio range in a process of mixing the N materials with the binder, and then the mixture may be dried and hardened. For example, the curing agent may include an Ascorbic Acid or Fiber Reinforced Plastics (FRP) curing agent.

According to an embodiment method of the disclosure, the material part 110 may need to be maintained in close contact with a preset surface area of the electrode part 105, and, when the electrode part 105 is electrically connected to the electric line 130 for power saving while the material part 110 is accommodated in the case 125, a surface area of the material part 110, contacting the thermally conductive material of the case 125, may need to be maintained in contact with the thermally conductive material.

Meanwhile, in a process of liquefying and drying the pulverized N materials through the binder, contraction exceeding a preset rate may occur. In this case, at least some of a close contact state between the preset surface area of the electrode part 105 and the material part 110 and a contact state between the surface area of the material part 110 and the thermally conductive material of the case 125 may be damaged. To avoid this, an anti-contraction agent for preventing contraction may be added in and mixed with the liquid mixture liquefied by mixing the binder with the pulverized N materials, while matching with a preset weight % ratio range, and then, the mixture may be dried. For example, the anti-contraction agent may include magnesium oxide or calcium carbonate pulverized into the preset particle size.

The material part 110 may have insulation resistance to be electrically insulated while designated power is applied to the electrode part 105. Preferably, the material part 110 may have insulation resistance of 100 MΩ or more in a state of being hardened to the preset compressive strength range. For example, the material part 110 may have insulation resistance of 100 MΩ or more between the electrode part 105 and a preset surface.

According to an embodiment method of the disclosure, preferably, the material part 110 hardened to the preset compressive strength range may include characteristics of causing no crack at a low voltage (for example, a voltage lower than 1,000 V) while a voltage of 1,000 V or more is applied to the electrode part 105 for one minute or more, or characteristics of causing no crack at a high voltage (for example, a voltage of 1,000 V or more) while a voltage of 12,000 V or more is applied to the electrode part 105 for one minute or more.

Meanwhile, the N materials included in the material part 110 may include n ($1 \leq n \leq N$) materials through which no current flows and which have magnetism to prevent short circuit between terminals. For example, the n materials having magnetism may include metal oxide materials.

Meanwhile, the N materials included in the material part 110 may include oxides having at least one of electrical insulation characteristics and thermal energy removal characteristics.

According to an embodiment method of the present disclosure, the oxides contained in the N materials may include a mixture state in which an oxidized material is mixed with a non-oxidized material of the same kind within a preset weight % ratio range under conditions with preset electrical insulation characteristics. That is, the present disclosure may not perform a process of calcining or oxidizing the N materials in a process of preparing the N materials and before or after pulverizing the N materials, and thus the oxides may include the mixture state of the oxidized material and the non-oxidized material of the same kind contained in raw materials corresponding to the N materials. However, when a weight % ratio of the oxidized material and the non-oxidized material of the same kind contained in the raw materials is outside a preset range (for example, when an oxidation reaction of the non-oxidized material is detected and/or insulation resistance of the material part 110 is less than 100 MΩ while the N materials are pulverized and exposed to the atmosphere), a process of calcining or oxidizing the N materials may be added or the raw materials may be replaced with other raw materials corresponding to the preset weight % ratio of the oxidized material and the non-oxidized material of the same kind.

According to an embodiment method of the present disclosure, preferably, the oxides may be prevented from contacting oxygen in the atmosphere by a film generated by the preset binder, in the state of being pulverized into the preset particle size range and bonded or hardened through the preset binder, and thereby, additional oxidation reactions of materials contained in the oxides may be prevented.

According to an embodiment method of the present disclosure, the oxides contained in the N materials may include aluminum oxide ($Al_2O_3$), and include at least one metal oxide of iron oxide ($Fe_2O_3$), magnesium oxide (MgO), or silicon dioxide ($SiO_2$). Meanwhile, the N materials may further include impurities of preset weight % or less contained in the raw materials in addition to the metal oxide including the aluminum oxide ($Al_2O_3$). However, for convenience, the present disclosure will omit a detailed description of the impurities.

The oxides may have thermal conductivity characteristics in a preset range for removing thermal energy, in the state of being pulverized into the preset particle size range and bonded or hardened through the binder. Also, the oxides may have insulation resistance characteristics in a preset range for electrical insulation, in the state of being pulverized into the preset particle size range and bonded or hardened through the binder.

According to an embodiment method of the present disclosure, the oxides may absorb all harmonics generated through a preset harmonic source (for example, an AC/DC converter or a device generating electromagnetic waves or frequency signals) and entered the electrode part 105 via the electric line 130, and remove the harmonics. Alternatively, the oxides containing the metal oxide may reduce all harmonics inside the electric line 130 by 65% or more on average by removing thermal energy inside the electric line 130.

According to an embodiment method of the present disclosure, the oxides may maintain thermodynamic stability to minimize thermal expansion or thermal contraction of the material part 110 with respect to a change in temperature, in the state of being pulverized into the preset particle size range and bonded or hardened through the binder.

Meanwhile, the oxides may maintain chemical stability of the material part 110 with respect to external chemical stimuli, in the state of being pulverized into the preset particle size range and bonded or hardened through the binder.

Meanwhile, the oxides may minimize dielectric loss between the electrode part 105 and the material part 110 in the state of being pulverized into the preset particle size range and bonded or hardened through the binder.

According to an embodiment method of the present disclosure, the N materials may preferably contain at least 30 weight % or more of aluminum oxide in order to implement the thermal energy removal characteristics and electrical insulation characteristics.

According to a first embodiment related to a composition of the oxides, the N materials may be produced by containing 30 weight % to 40 weight % of aluminum oxide, 10 weight % to 15 weight % of iron oxide, 20 weight % to 25 weight % of silicon dioxide, and 5 weight % to 10 weight % magnesium oxide in order to implement the thermal energy removal characteristics and electrical insulation characteristics.

According to a second embodiment related to a composition of the oxides, the N materials may be produced by containing 40 weight % to 50 weight % of aluminum oxide, 20 weight % to 30 weight % of silicon dioxide, 5 weight % to 10 weight % of iron oxide, and 5 weight % to 10 weight % magnesium oxide in order to implement the thermal energy removal characteristics and electrical insulation characteristics.

According to a third embodiment related to a composition of the oxides, the N materials may be produced by containing 50 weight % to 60 weight % of aluminum oxide, 20 weight % to 30 weight % of silicon dioxide, and 5 weight % to 10 weight of iron oxide in order to implement the thermal energy removal characteristics and electrical insulation characteristics.

According to a fourth embodiment related to a composition of the oxides, the N materials may be produced by containing 95 weight % to 96 weight % of aluminum oxide and 4 weight % to 5 weight % of impurities ($P_2O_5$, $SO_3$, $K_2O$) in order to implement the thermal energy removal characteristics and electrical insulation characteristics.

According to an embodiment method of the present disclosure, the N materials may be implemented through at least one mineral among bauxite-based materials and tourmaline-based materials, instead of the above-mentioned N materials, for special purposes or uses.

Referring to FIG. 1, the electric power saving device 100 may further include a connection part 115 for electrically connecting the electrode part 105 to the electric line 130, and/or a fixing part 120 for placing and fixing the electrode part 105 at a preset position inside the material part 110.

The material part 110 may be produced by mixing a powder mixture produced by pulverizing the N materials into the preset particle size range with the binder while matching with the preset weight % ratio range, stirring the mixture, pouring the liquefied liquid mixture into the case 125, and drying or hardening the liquid mixture, and the electrode part 105 may be placed and fixed at a preset location inside the material part 110, which is spaced apart from the surface area of the material part 110 by the preset distance or more. For example, in the material part 110 having a rectangular parallelepiped structure, the electrode part 105 may be placed and fixed at a center portion of the material part 110, which is spaced apart from upper, lower, left, and right sides of the rectangular parallelepiped by the preset distance or more. The fixing part 120 may be provided in the case 125, as shown in FIG. 1, to place and fix the electrode part 105 at the preset location spaced apart from each side of the case 125 by the preset distance or more, and accordingly, the electrode part 105 may be placed and fixed at the preset location inside the material part 110, which is spaced apart from the surface area of the material part 110 by the preset distance or more.

According to an embodiment method of the present disclosure, preferably, the fixing part 120 may have electrical insulation characteristics. The plurality of electrode parts 105 arranged and fixed inside the material part 110 may be insulated from each other due to the electrical insulation characteristics of the fixing part 120 and the electrical insulation characteristics of the material part 110. Meanwhile, the fixing part 120 may be manufactured using a separate insulating material and then used to place and fix the electrode part 105, or the fixing part 120 may be made by containing the same (or equivalent) material as the material constituting the material part 110 and then used to place and fix the electrode part 105. The fixing part 120 and the material part 110 manufactured by containing the same (or equivalent) material may improve thermal energy removal performance of the material part 110 compared to a case in which the fixing part 120 and the material part 110 are manufactured by containing different insulating materials.

According to an embodiment method of the present disclosure, the electrode part 105 may be integrated into the electric line 130 made of an electrically conductive and thermally conductive material. Alternatively, the electrode part 105 may be electrically connected to the electric line 130 through the connection part 115 that is detachable from the electric line 130, as shown in FIG. 1.

The connection part 115 may include at least one, two or more combinations of a contact terminal including a material having both electrical conductivity and thermal conductivity, a fastening bolt including a material having both electrical conductivity and thermal conductivity, and a conducting wire including a material having both electrical conductivity and thermal conductivity and protected by an insulated coating, in order to connect the electrode part 105 to the electric line 130. For example, the connection part 115 may electrically connect the electrode part 105 placed and fixed at the preset location inside the material part 110 through the fixing part 120 to the electric line 130 by using the contact terminal, the fastening bolt, and the conducting wire.

According to an embodiment method of the present disclosure, the material part 110 including the electrode part 105 may connect the electrode part 105 to the electric line 130, in the state of being accommodated in the case 125. In this case, the case 125 accommodating the material part 110 may be maintained in contact with at least one of the surface areas of the material part 110. Meanwhile, preferably, the case 125 may include a thermally conductive material for receiving thermal energy from the surface area of the material part 110 being in contact with the case 125, and thermal energy conducted to the thermally conductive material may be discharged to the atmosphere. However, the thermally conductive material of the case 125 may be electrically insulated from the electrode part 105 and the electric line 130 for safety. Meanwhile, an outer shape of the case 125 may include a geometric structure that matches with a geometric structure of a space for electrically connecting the electrode part 105 included in the material part 110 to the electric line 130.

Meanwhile, according to another embodiment method of the present disclosure, because the material part 110 has electrical insulation characteristics, the case 125 may be omitted and the surface area of the material part 110 may be directly exposed. The present disclosure is not limited to this.

Figure 2:
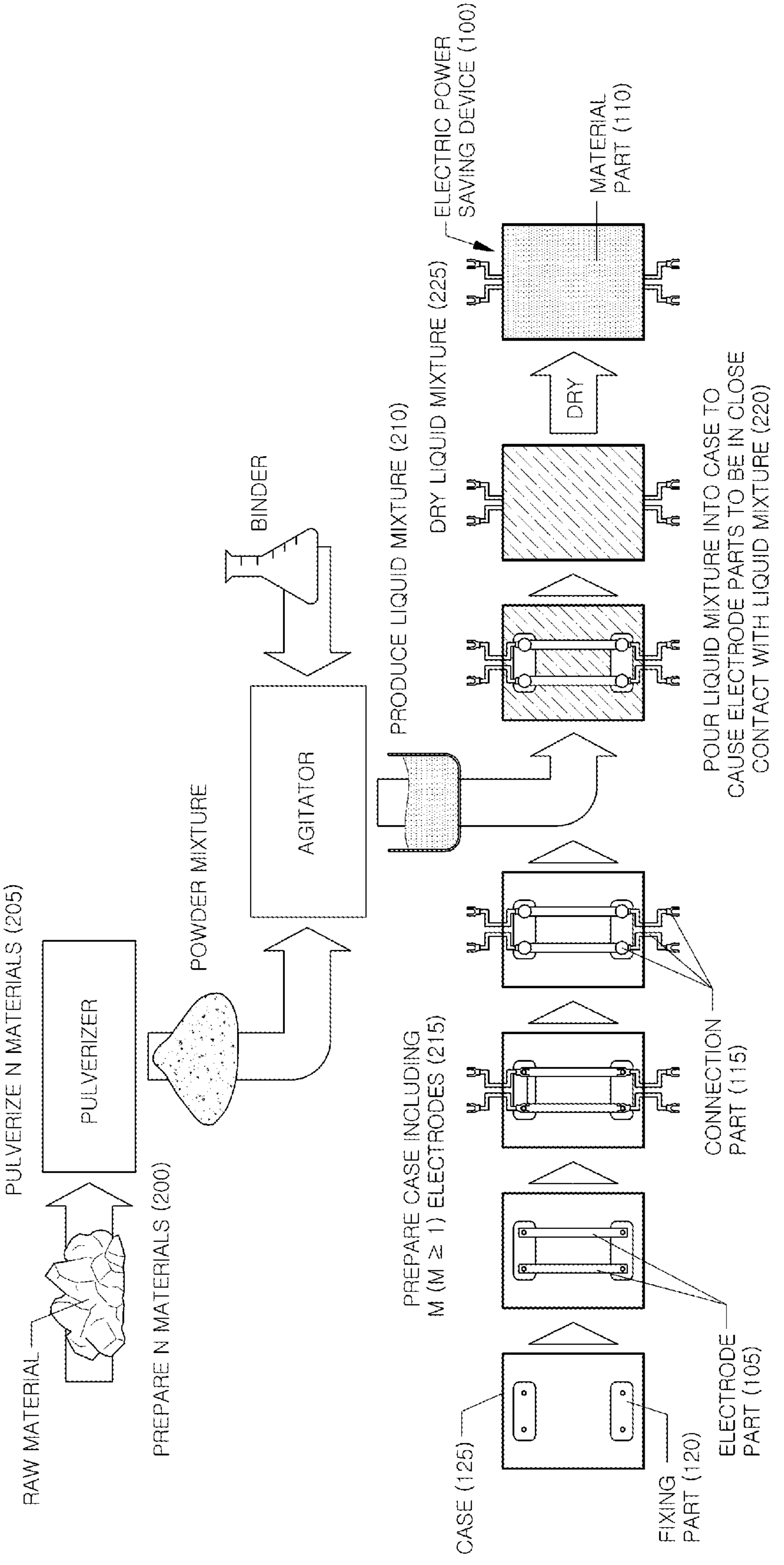
FIG. 2 shows a process of manufacturing an electric power saving device 100 according to an embodiment method of the disclosure.

FIG. 2 shows a process of manufacturing an electric power saving device 100 according to an embodiment method of the disclosure.

More specifically, FIG. 2 shows a process of manufacturing the electric power saving device 100 that includes the material part 110 having thermal energy removal characteristics of removing thermal energy conducted to the electrode part 105 made of a material having electrical conductivity and thermal conductivity, and electrical insulation characteristics with respect to the electrode part 105, and persons of ordinary skill in the technical art to which the present disclosure belongs will be able to infer various embodiment methods (for example, embodiment methods of omitting some operations or changing the order of operations) of the manufacturing process by referring to and/or modifying FIG. 2. However, the present disclosure may include all the inferred embodiment methods and the technical feature of the present disclosure is not limited only to the embodiment method shown in FIG. 2. For convenience, FIG. 2 shows a process of manufacturing a serial electric power saving device 100.

Referring to FIG. 2, the present disclosure may prepare N materials for implementing electrical insulation characteristics and thermal energy removal characteristics in order to manufacture the electric power saving device 100 (200).

According to a first embodiment of preparing the N materials, the present disclosure may prepare the N materials by matching with a preset weight % ratio range for each material.

Meanwhile, according to a second embodiment of preparing the N materials, the present disclosure may prepare i (i≥1) raw materials including the N materials each matching with a preset weight % ratio range.

Meanwhile, according to a third embodiment of preparing the N materials, the present disclosure may prepare j (j≥1) raw materials including s (1≤s≤N) materials among the N materials and prepare t (1≤t≤N) materials for matching weight % for each of the s materials with a preset weight % ratio range.

The present disclosure may pulverize the prepared N materials into a preset particle size range through a pulverizer to produce a powder mixture (205). Preferably, the present disclosure may pulverize the N materials into particle sizes of 100 mesh to 120 mesh to produce the powder mixture.

The present disclosure may mix the pulverized N materials with a binder while matching with a preset weight % ratio and then stir the mixture through an agitator to produce a liquid mixture (210). Meanwhile, when there is a possibility that a compressive strength of a material part 110 hardened by drying the liquid mixture will fail to reach a preset compressive strength range (for example, 85 kgf/cm$^2$ or more) or when it is intended to harden to the preset compressive strength range, the present disclosure may additionally mix a curing agent for hardening a compressive strength of the material part 110 to the preset compressive strength range with the liquid mixture while matching with a preset weight % ratio range. Meanwhile, when there is a possibility that contraction exceeding a preset rate or more will occur in a process of drying the liquid mixture, the present disclosure may additionally mix an anti-contraction agent for preventing the contraction with the liquid mixture while matching with a preset weight % ratio range.

Meanwhile, while or before the liquid mixture is produced, the present disclosure may prepare a case 125 in which M (M≥1) electrode parts 105 including an electrically conductive and thermally conductive material are arranged and fixed at preset locations inside the case 125 (215). Meanwhile, the case 125 may be arranged and fixed at the preset locations inside the case 125 through a fixing part 120, as shown in the example of FIG. 2, and may include a connection part 115 for connecting to an electric line 130. Meanwhile, when the plurality of electrode parts 105 are arranged and fixed inside the case 125, as shown in the example of FIG. 2, the plurality of electrode parts 105 may be arranged and fixed in a state of being electrically insulated from each other.

According to an embodiment method of the disclosure, a number M of the electrode parts 105 may preferably correspond to a number of electric lines 130, and in some cases, an electrode part 105 corresponding to a ground line may be omitted.

The present disclosure may pour the liquid mixture into an inside space of the case 125 in which the M electrode parts 105 are arranged and fixed at the preset locations to cause the electrode parts 105 to be in close contact with the liquid mixture (220). According to an embodiment method of the disclosure, a vibrator (not shown) may vibrate the liquid mixture poured into the case 125 to improve adhesion between the electrode parts 105 and the liquid mixture.

Meanwhile, in a case in which the material part 110 is taken out of the case 125 and then the electrode parts 105 are electrically connected to the electric line 130 to be used as an electric power saving device 100, a releasing agent (not shown) for releasing the material part 110 may be applied onto an inner surface of the case 125 and then the liquid mixture may be poured into the case 125.

The present disclosure may manufacture the electric power saving device 100 including the material part 110 having electrical insulation characteristics and thermal energy removal characteristics of removing thermal energy inside the electric line 130, conducted to the electrode parts 105 by drying or hardening the liquid mixture while maintaining the liquid mixture in close contact with the electrode parts 105 (225). Meanwhile, in the case in which the material part 110 is taken out of the case 125 and then the electrode parts 105 are electrically connected to the electric line 130 to be used as the electric power saving device 100, the electric power saving device 100 including the material part 110 taken out of the case 125 may be manufactured.

Figure 3:
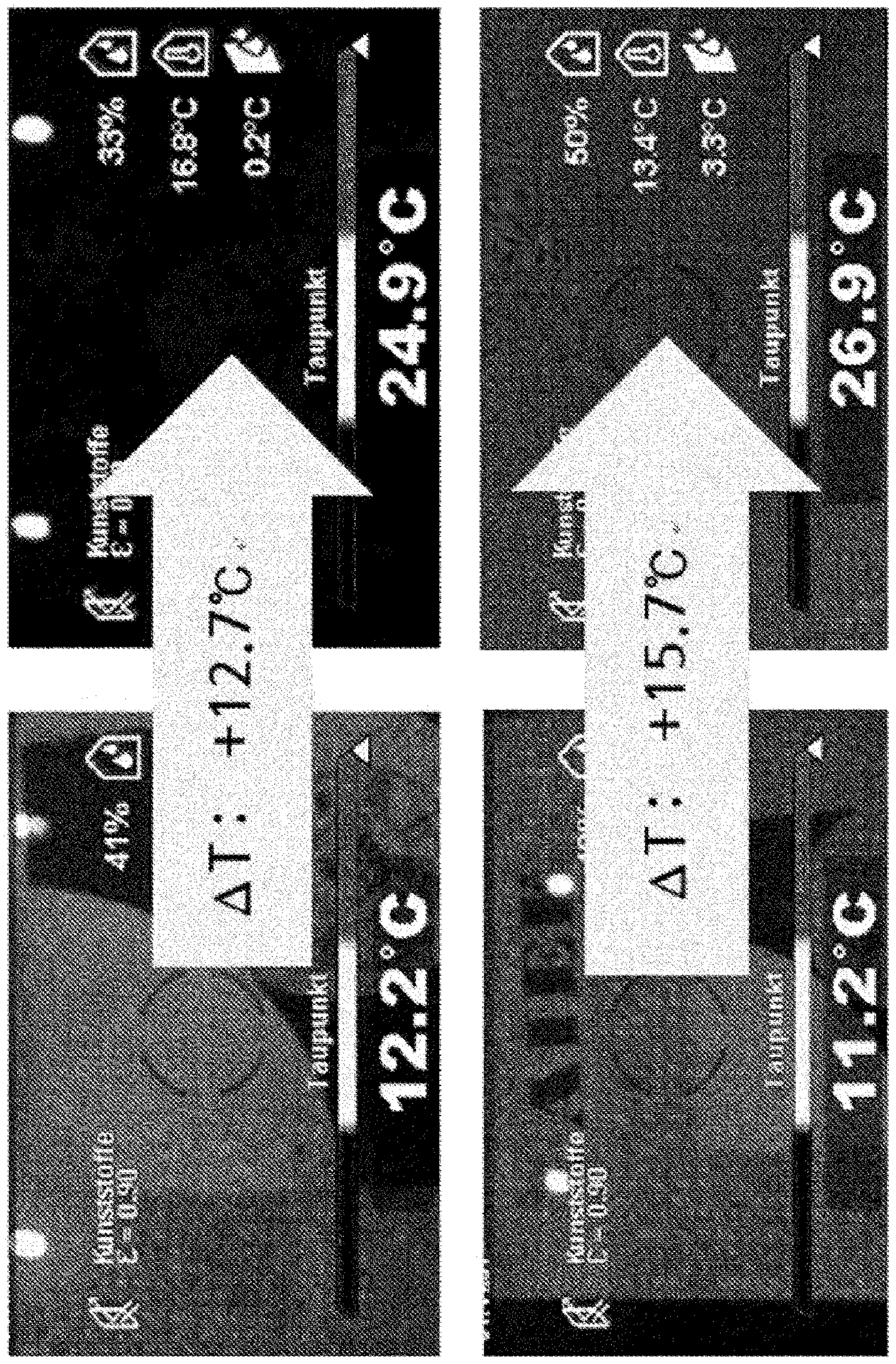
FIG. 3 is a diagram showing surface temperature of an electric power saving device of removing thermal energy, according to an embodiment method of the disclosure.

FIG. 3 is a diagram showing surface temperature of an electric power saving device 100 of removing thermal energy, according to an embodiment method of the disclosure.

More specifically, FIG. 3 is a diagram obtained by photographing surface temperature of the electric power saving device 100 using a thermal imaging camera, wherein (a) in FIG. 3 was obtained by photographing the electric power saving device 100 through the thermal imaging camera before connecting the electric power saving device 100 to the electric line 130 or before applying power to the electric line 130 connected to the electric power saving device 100, and (b) in FIG. 3 was obtained by photographing the electric power saving device 100 through the thermal imaging camera after connecting the electric power saving device 100 to the electric line 130 or after applying power to the electric line 130 connected to the electric power saving device 100.

Referring to (a) of FIG. 3, surface temperature of the electric power saving device 100 before the electric power saving device 100 is connected to the electric line 130 or before power is applied to the electric line 130 connected to the electric power saving device 100 was 12.2° C. and 11.2° C. Meanwhile, referring to (b) of FIG. 3, when 10 minutes or more elapse after the electric power saving device 100 is connected to the electric line 130 or power is applied to the electric line 130 connected to the electric power saving device 100, surface temperature of the electric power saving device 100 was 24.9° C. and 26.9° C. risen by 12.7° C. and 15.7° C., respectively. This means that line internal temperature was conducted to the electric power saving device 100. At this time, the surface temperature of the electric line 130 may include temperature matching with surface temperature of the electric power saving device 100 within an error range of a first decimal place.

Figure 4:
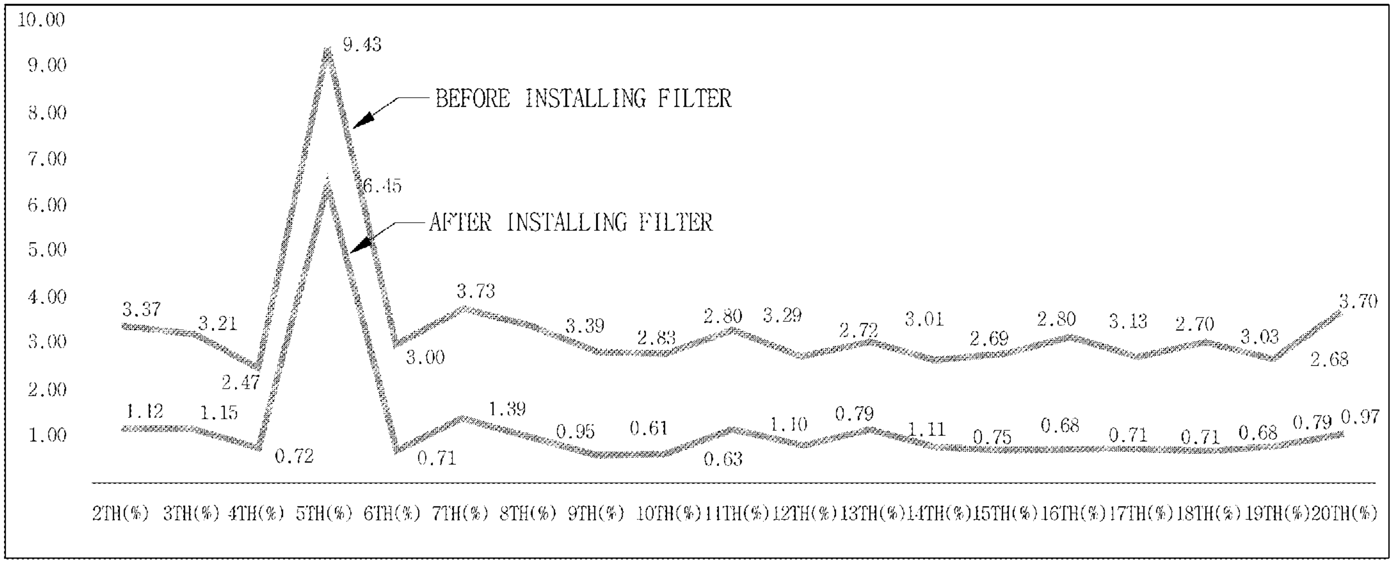
FIG. 4 is a diagram showing a harmonics reduction through removal of thermal energy of an electric line 130 according to an embodiment method of the disclosure.

FIG. 4 is a diagram showing a harmonics reduction through removal of thermal energy of an electric line 130 according to an embodiment method of the disclosure.

More specifically, FIG. 4 is a diagram obtained by measuring harmonic generation rates before and after connecting the electric power saving device 100 according to the present disclosure to a high-voltage compressor using 6,600V power in a semiconductor factory. Referring to FIG. 4, $2^{nd}$ to $20^{th}$ harmonics were measured under the same conditions before and after the electric power saving device 100 according to the present disclosure is connected, and compared to before the electric power saving device 100 is connected. 69.5% or more of harmonics on average were removed.

According to the disclosure, by connecting the electric power saving device according to the disclosure to an electric line to remove thermal energy in the electric line, current loss caused by thermal energy in the electric line may be minimized, thereby saving power.

The invention claimed is:

1. An electric power saving device comprising:

an electrode part electrically connected to an electric line and made of a material having electrical conductivity and thermal conductivity; and a material part maintained in contact with a surface of the electrode part and including N (N≥2) materials for implementing electrical insulation characteristics and thermal energy removal characteristics of removing thermal energy inside the electric line, conducted to the electrode part, wherein the N materials include oxides having electrical insulation characteristics and thermal energy removal characteristics, wherein the oxides include 95 to 96 wt % of aluminum oxide; and 4 to 5 wt % of impurities consisting of $P_2O_5$, $SO_3$ and $K_2O$, wherein the material part has a compressive strength range of at least 85 kgf/cm$^2$ or more, wherein the material part has an insulation resistance of 100 MΩ or more, and wherein the electric power saving device reduces intensities of $2^{nd}$ to $50^{th}$ harmonics existing in the electric line connected to the electrode part by 65% or more.

2. The electric power saving device of claim 1, wherein the material part removes the thermal energy generated in the electric line and primarily conducted to the electrode part.

3. The electric power saving device of claim 1, wherein the material part removes the thermal energy generated in a designated source electrically connected to the electric line, primarily conducted to the electric line, and then secondarily conducted to the electrode part.

4. The electric power saving device of claim 1, wherein, while power of the electric line is applied to the electrode part, the material part maintains a thermal equilibrium state corresponding to a surface temperature within a preset allowable temperature range with respect to a temperature of the electrode part.

5. The electric power saving device of claim 4, wherein, while the material part is outside the thermal equilibrium state, a plurality of electrode parts being in contact with a plurality of material parts is multiply-connected to the electric line by a preset electrical connection method to increase a volume or a surface area of the material part and thereby maintain the thermal equilibrium state.

6. The electric power saving device of claim 1, wherein, while power of the electric line is applied to the electrode part, the material part maintains a thermal equilibrium state corresponding to a surface temperature of atmosphere temperature or less.

7. The electric power saving device of claim 6, wherein, while the material part is outside the thermal equilibrium state, a plurality of electrode parts being in contact with a plurality of material parts is multiply-connected to the electric line by a preset electrical connection method to increase a volume or a surface area of the material part and thereby maintain the thermal equilibrium state.

8. The electric power saving device of claim 1, wherein, while power of the electric line is applied to the electrode part, the material part maintains a thermal equilibrium state corresponding to a surface temperature within a preset temperature range in a range of 18° C. to 35° C.

9. The electric power saving device of claim 8, wherein, while the material part is outside the thermal equilibrium state, a plurality of electrode parts being in contact with a plurality of material parts is multiply-connected to the electric line by a preset electrical connection method to increase a volume or a surface area of the material part and thereby maintain the thermal equilibrium state.

10. The electric power saving device of claim 1, wherein the N materials are maintained in a state of being pulverized into a preset particle size range and distributed uniformly in the material part.

11. The electric power saving device of claim 1, wherein the material part is maintained in a state resulting from mixing the N materials pulverized into a preset particle size range with a preset binder while matching with a preset weight % ratio range and then drying and hardening the mixture.

12. The electric power saving device of claim 11, wherein the binder prevents the N materials from contacting oxygen in an atmosphere.

13. The electric power saving device of claim 1, wherein the material part includes characteristics of causing no crack at a low voltage while a voltage of 1,000 V or more is applied to the electrode part for one minute or more, or characteristics of causing no crack at a high voltage while a voltage of 12,000 V or more is applied to the electrode part for one minute or more.

* * * * *